US010341601B2

(12) United States Patent
Shin

(10) Patent No.: US 10,341,601 B2
(45) Date of Patent: Jul. 2, 2019

(54) IMAGE PROCESSING APPARATUS, IMAGING APPARATUS, AND IMAGE PROCESSING METHOD

(71) Applicant: CANON KABUSHIKI KAISHA, Tokyo (JP)

(72) Inventor: Akihito Shin, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/709,202

(22) Filed: Sep. 19, 2017

(65) Prior Publication Data

US 2018/0091759 A1 Mar. 29, 2018

(30) Foreign Application Priority Data

Sep. 27, 2016 (JP) .................................. 2016-188326

(51) Int. Cl.
*H04N 5/57* (2006.01)
*H04N 5/232* (2006.01)
*H04N 5/235* (2006.01)

(52) U.S. Cl.
CPC ............. *H04N 5/57* (2013.01); *H04N 5/2351* (2013.01); *H04N 5/23293* (2013.01)

(58) Field of Classification Search
CPC .... H04N 5/57; H04N 5/23293; H04N 5/2351; H04N 1/407; H04N 5/202; H04N 5/2355; H04N 5/235; H04N 5/243; G06T 5/007; G06T 5/009
USPC ........................................ 348/230.1; 382/274
See application file for complete search history.

(56) References Cited

U.S. PATENT DOCUMENTS

| 2009/0073287 | A1* | 3/2009 | Shimizu | H04N 5/23212 348/234 |
| 2009/0180689 | A1* | 7/2009 | Komiya | H04N 1/603 382/167 |
| 2010/0177215 | A1* | 7/2010 | Kita | G06T 5/008 348/234 |
| 2017/0105042 | A1* | 4/2017 | Toma | H04N 5/765 |

FOREIGN PATENT DOCUMENTS

JP 2004-286979 A 10/2004

\* cited by examiner

*Primary Examiner* — Albert H Cutler
(74) *Attorney, Agent, or Firm* — Canon U.S.A., Inc. IP Division

(57) ABSTRACT

An image processing apparatus receives an input of an image signal obtained by imaging an object, and performs signal conversion on the image signal to output the image signal to a display apparatus. The image processing apparatus includes a calculation unit configured to calculate an absolute luminance value of the object from a luminance value of the object acquired from the image signal and an exposure parameter in the imaging, a determination unit configured to determine a predetermined absolute luminance code for the luminance value of the object according to input-output characteristics of the display apparatus so that the object is displayed at the absolute luminance value on the display apparatus, and a conversion unit configured to perform signal conversion for converting the image signal based on a relationship between the luminance value of the object and the absolute luminance code.

20 Claims, 6 Drawing Sheets

IMAGE PROCESSING APPARATUS, IMAGING APPARATUS, AND IMAGE PROCESSING METHOD

BACKGROUND OF THE INVENTION

Field of the Invention

The aspect of the embodiments relates to signal processing for performing video display at an absolute luminance of an object.

Description of the Related Art

Conventionally, the dynamic range of an output of a display apparatus, such as a television or a display, is considerably small compared with an actual object, and a video of the object can be displayed only in a limited dynamic range. To that end, in imaging an object with an imaging apparatus, it is necessary to compress the dynamic range so as to squeeze a video signal with a wide dynamic range into the dynamic range corresponding to the output of the display apparatus. Such processing causes the display apparatus to display a video with a state different from an actual appearance, and realism is lost.

For example, assume that the dynamic range of a video signal is compressed in such a manner that a face to become a main object has brightness of about 70% of an output of a display apparatus. In such a case, the face is displayed with brightness appropriate for viewing. However, since the brightness of the video is different from actual brightness, the realism is lost. Moreover, the tone of an object brighter than the face is largely compressed and lost in the video.

In recent years, performance of display apparatuses has improved, which has made it possible to express a wider dynamic range.

However, in a case where a display apparatus capable of expressing a wide dynamic range displays a video captured by a conventional imaging apparatus, the captured video is displayed with unsuitable brightness with respect to an actual object in some cases. Thus, it is necessary to perform processing different from video-signal processing performed in the conventional imaging apparatus.

For example, assume that processing is performed so that a face to become a main object is about 70% of an output of a display apparatus. In this case, if the display apparatus can support 10000 cd/m² at the maximum, the face is displayed with brightness of 7000 cd/m², which is unrealistic brightness.

As discussed in Japanese Patent Laid-Open No. 2004-286979, tones to be reproduced can be addressed by performing suitable tone processing according to an absolute luminance of an object. However, this is not enough to enable a display apparatus to display the object with the same brightness as that of the object when actually viewed.

SUMMARY OF THE INVENTION

According to an aspect of the embodiments, an image processing apparatus receives an input of an image signal obtained by imaging an object, and performs signal conversion on the image signal to output the image signal to a display apparatus. The image processing apparatus includes a calculation unit configured to calculate an absolute luminance value of the object from a luminance value of the object acquired from the image signal and an exposure parameter in the imaging, a determination unit configured to determine a predetermined absolute luminance code for the luminance value of the object according to input-output characteristics of the display apparatus so that the object is displayed at the absolute luminance value on the display apparatus, and a conversion unit configured to perform signal conversion for converting the image signal based on a relationship between the luminance value of the object and the absolute luminance code.

Further features of the disclosure will become apparent from the following description of exemplary embodiments with reference to the attached drawings.

DESCRIPTION OF THE EMBODIMENTS

Exemplary embodiments of the disclosure will be described below with reference to the drawings.

Figure 1:
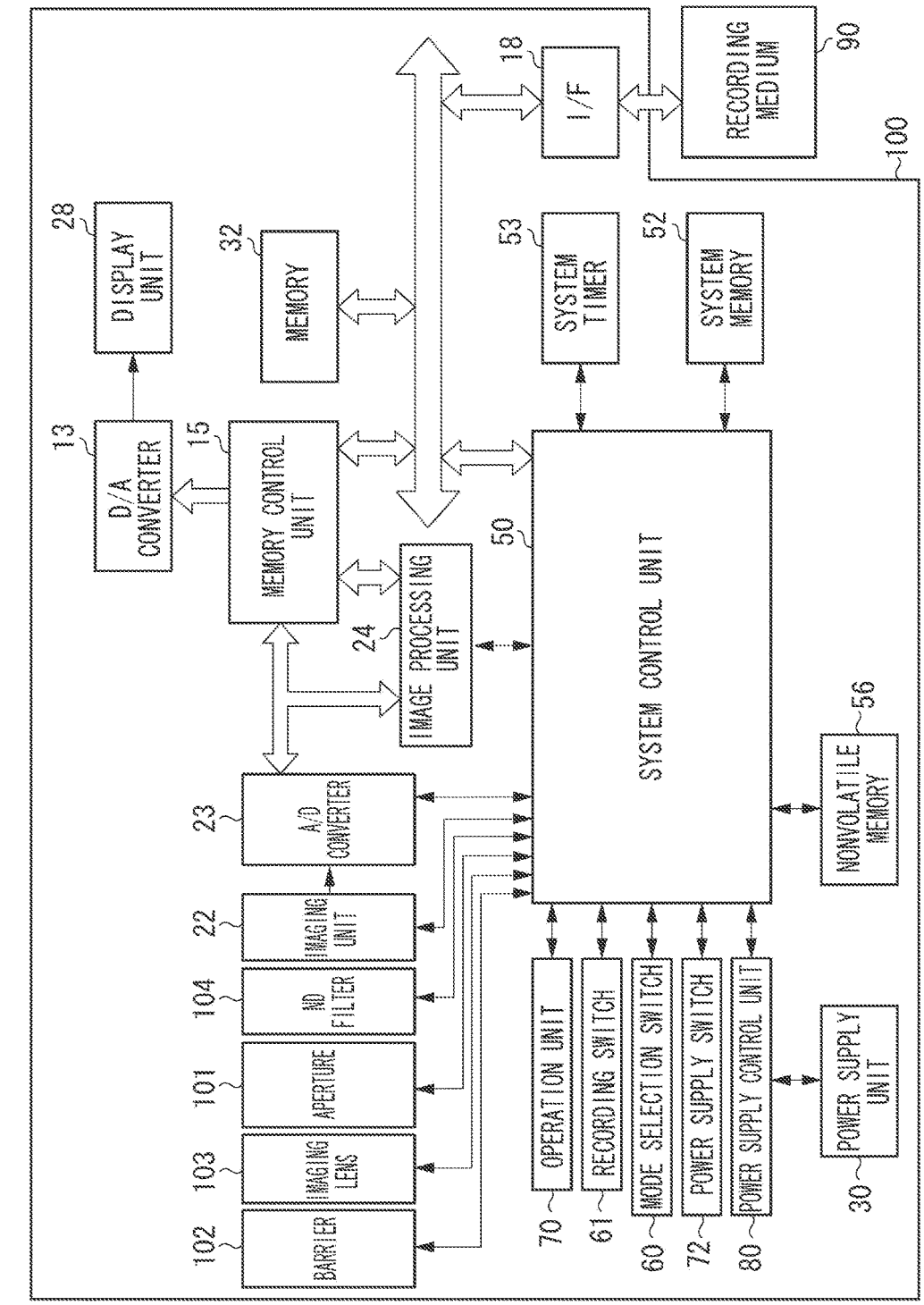
FIG. 1 is a block diagram illustrating a configuration of a digital video camera.

A first exemplary embodiment of the disclosure will be described below. FIG. 1 is a block diagram illustrating an internal configuration of a digital video camera 100 according to the present exemplary embodiment.

In FIG. 1, an imaging lens 103 is a lens group including a zoom lens and a focus lens, and forms an object image on an imaging unit 22. An aperture 101 is used for light-amount adjustment. A neutral density (ND) filter 104 is used for light reduction.

The imaging unit 22 is an image sensor including a charge coupled device (CCD) sensor or a complementary metal oxide semiconductor (CMOS) sensor that converts an optical image into an electrical signal. The imaging unit 22 also has functions, such as controlling of accumulation with an electronic shutter, and changing of an analog gain and a reading speed. An analog-to-digital (A/D) converter 23 converts an analog signal into a digital signal. The A/D converter 23 is used to convert an analog signal output from the imaging unit 22, into a digital signal. A barrier 102 covers an imaging system including the imaging lens 103 of the digital video camera 100, protecting the imaging system from dirt and damage. The imaging system of the digital video camera 100 includes the imaging lens 103, the aperture 101, and the imaging unit 22.

An image processing unit 24 performs, for example, color conversion processing, gamma correction processing, and digital-gain addition processing on image data from the A/D converter 23 or image data from a memory control unit 15. The image processing unit 24 performs predetermined arithmetic processing by using image data representing a captured image, and then transmits an arithmetic result to a system control unit 50. On the basis of the transmitted arithmetic result, the system control unit 50 performs exposure control, ranging control, and white balance control. This configuration enables the execution of processing including autofocus (AF) processing of a through-the-lens (TTL) format, automatic exposure (AE) processing, and automatic white balance (AWB) processing. Details of the image processing unit 24 will be described below.

The image data output from the A/D converter 23 is written in a memory 32, via the image processing unit 24 and the memory control unit 15, or directly via the memory control unit 15. The memory 32 stores image data, which is digital data resulting from conversion by the A/D converter 23 after imaging by the imaging unit 22. The memory 32 also stores image data to be displayed by a display unit 28. The memory 32 has a storage capacity sufficient for storage of a moving image and sound that last for a predetermined time.

The memory 32 also serves as a memory (a video memory) for image display. A digital-to-analog (D/A) converter 13 converts data for image display stored in the memory 32 into an analog signal, and supplies the analog signal to the display unit 28. In this way, the image data for display written in the memory 32 is displayed by the display unit 28 via the D/A converter 13.

The display unit 28, serving as a display apparatus, performs display on a display device, such as a liquid crystal display (LCD), according to an analog signal from the D/A converter 13. Converting the digital signals accumulated in the memory 32 after the A/D conversion by the A/D converter 23 into analog signals with the D/A converter 13 and transferring the analog signals consecutively to the display unit 28 enable the display unit 28 to function as an electronic viewfinder and displaying a live image.

A nonvolatile memory 56 allows digital data to be electrically erased and recorded. For example, an electrically erasable programmable read only memory (EEPROM) is used for the nonvolatile memory 56. The nonvolatile memory 56 stores, for example, a program and constants for operation of the system control unit 50. The program mentioned here represents a program for executing various flowcharts to be described below.

The system control unit 50 controls the entire digital video camera 100. The system control unit 50 executes the program recorded in the nonvolatile memory 56 described above to implement each process to be performed in the digital video camera 100. A system memory 52 is, for example, a random access memory (RAM), and loads variables, the program read from the nonvolatile memory 56, and the constants for the operation of the system control unit 50. In addition, the system control unit 50 can perform display control, by controlling each of components including the memory 32, the D/A converter 13, and the display unit 28.

A system timer 53 is a clocking unit for measuring the time to be used for various controls to be performed in the digital video camera 100, as well as the time of a built-in clock. A mode selection switch 60, a recording switch 61, and an operation unit 70 are operation units for inputting various operation instructions into the system control unit 50.

The mode selection switch 60 can change the operation mode of the system control unit 50 to any one of modes including a moving image capturing mode, a still image capturing mode, and a playback mode. The moving image capturing mode and the still image capturing mode include modes such as an automatic image capturing mode, an automatic scene determination mode, a manual mode, various scene modes in which image-capturing settings are individually provided for each scene, a program AE mode, and a custom mode.

A user can change the operation mode to any of these modes included in the image capturing modes with the mode selection switch 60. Alternatively, the user may change the operation mode to the moving image capturing mode with the mode selection switch 60, and then may change the operation mode to any one of the modes included in the moving image capturing mode with another operation member. The recording switch 61 switches between an image-capturing standby state and an image-capturing state. The recording switch 61 allows the system control unit 50 to start a series of operations from reading of a signal from the imaging unit 22 to writing of moving-image data into a recording medium 90.

A function for each scene is assigned to individual operation members of the operation unit 70 as appropriate by a user operation, for example, selecting any of various function icons displayed on the display unit 28. The operation members of the operation unit 70 thus act as various function buttons. The function buttons include an end button, a back button, an image forward button, a jump button, a depth-of-field preview button, and an attribute change button. For example, with a menu button being pressed, a menu screen allowing various settings to be set appears on the display unit 28. The user can intuitively perform various kinds of settings using the menu screen displayed on the display unit 28, a cross key movable in four directions of up, down, right, and left directions, and a SET button.

A power supply control unit 80 includes a battery detecting circuit, a direct current to direct current (DC-DC) converter, and a switch circuit for switching between blocks to be supplied with power. The power supply control unit 80 detects whether a battery is attached, a battery type, and a remaining battery level. The power supply control unit 80 controls the DC-DC converter, based on a result of the detection and an instruction of the system control unit 50, so as to supply a necessary voltage to each of components including the recording medium 90 for a necessary period. A power supply unit 30 includes a primary battery, such as an alkaline battery or a lithium battery, a secondary battery, such as a nickel-cadmium (NiCd) battery, a nickel-metal hydride (NiMH) battery, or a lithium(Li)-ion battery, and an alternate current (AC) adapter. An interface (I/F) 18 is an interface with the recording medium 90, such as a memory card or a hard disk, or with an external output apparatus. FIG. 1 illustrates a state at the time of connection with the recording medium 90. The recording medium 90 is a recording medium, such as a memory card for recording a captured image. The recording medium 90 may include, for example, a semiconductor memory and a magnetic disk.

Figure 2:
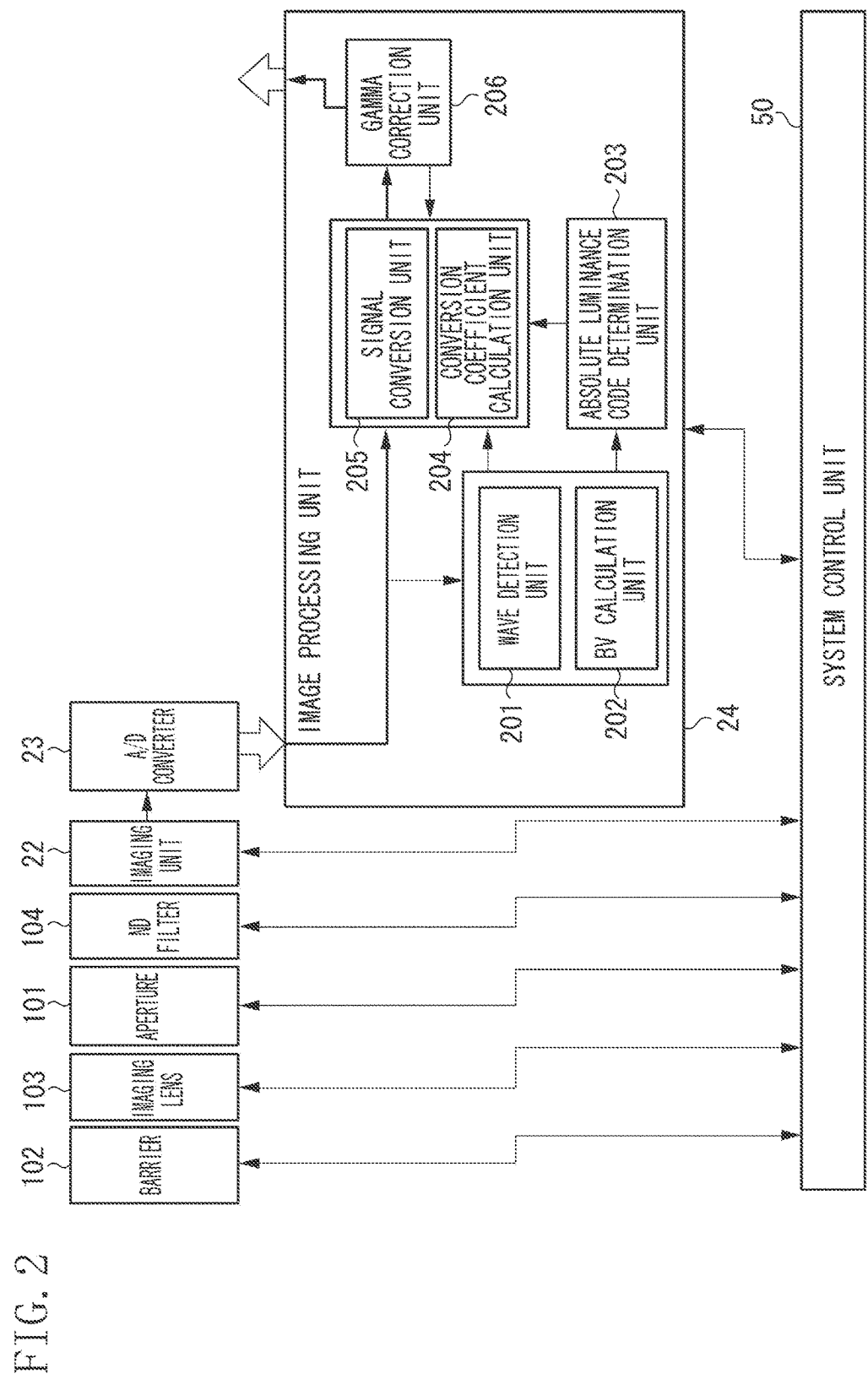
FIG. 2 is a block diagram illustrating an internal configuration of an image processing unit.

Next, an internal configuration of the image processing unit 24 will be described. FIG. 2 is a block diagram illustrating the internal configuration of the image processing unit 24.

The image processing unit 24 controls white balance (WB) and sharpness. The illustration thereof is omitted. Each block in the image processing unit 24 can acquire any kinds of data about the digital video camera 100, including exposure parameters such as an aperture, ND information, and a shutter speed in imaging, via the system control unit 50.

In FIG. 2, a wave detection unit 201 acquires a representative value as a luminance value of an object within an image, by performing wave detection on image data from the memory control unit 15 or image data from the A/D converter 23. A Bv calculation unit 202 calculates a Bv value (an absolute luminance value) of the object based on the exposure parameters, such as a reference signal, an aperture, a sensitivity, and a shutter value, and the representative value acquired by the wave detection unit 201.

An absolute luminance code determination unit 203 acquires input-output characteristics of the display unit serving as the display apparatus from the nonvolatile memory 56 or the memory control unit 15. The absolute luminance code determination unit 203 then determines an absolute luminance code in such a manner that the display apparatus displays the object with the Bv value (the absolute luminance value) calculated by the Bv calculation unit 202.

The input-output characteristics of the display apparatus may be recorded in the nonvolatile memory 56 beforehand. Alternatively, the input-output characteristics of the display apparatus may be input by the user, or may be acquired from the connected display apparatus. An acquisition method is not limited in particular.

A conversion coefficient calculation unit 204 acquires a gamma characteristic from a gamma correction unit 206, and the determined absolute luminance code from the absolute luminance code determination unit 203. From the gamma characteristic and the absolute luminance code, the conversion coefficient calculation unit 204 calculates a signal conversion coefficient, which is a coefficient for converting a signal for display with an absolute luminance on the display apparatus.

A signal conversion unit 205 performs signal conversion on the image data from the A/D converter 23 or the image data from the memory control unit 15, by using the signal conversion coefficient calculated in the conversion coefficient calculation unit 204.

The gamma correction unit 206 changes input-output characteristics, i.e., gamma characteristic, of a video to perform gamma correction on the image data that has been subjected to the signal conversion by the signal conversion unit 205.

The system control unit 50 loads the program stored in the nonvolatile memory 56 in the system memory 52, thereby implementing each process in the present exemplary embodiment.

Figure 3:
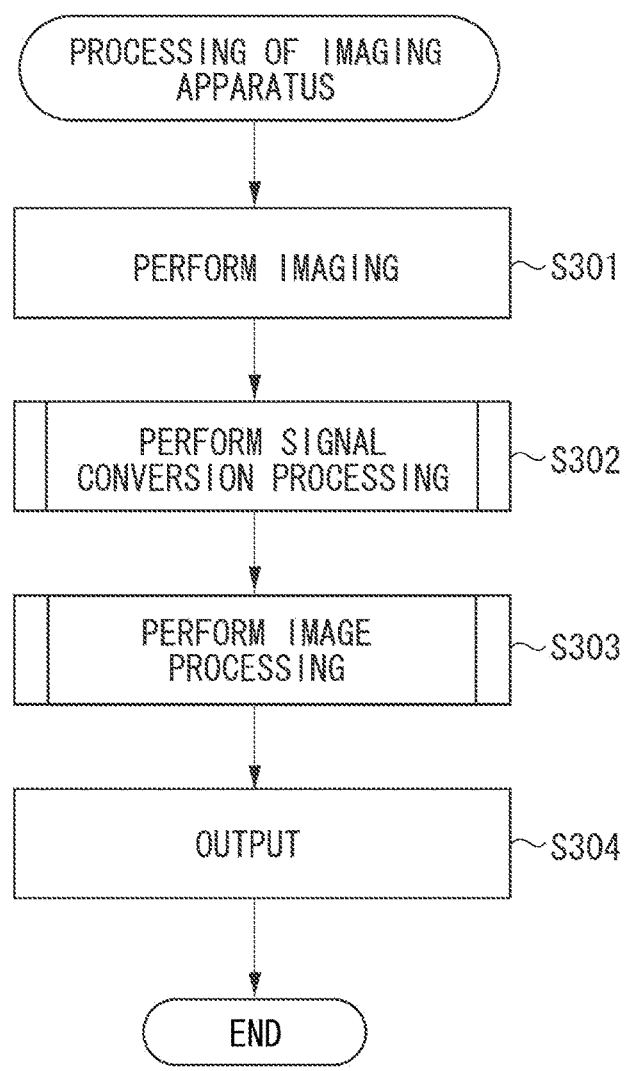
FIG. 3 is a flowchart illustrating a flow of processing of an imaging apparatus.

Next, operation to be performed in the digital video camera 100 will be described with reference to FIG. 3. FIG. 3 illustrates a flowchart of imaging processing of an imaging apparatus according to the present exemplary embodiment.

First, in step S301, the imaging unit 22 holds an object within a filed angle, and images an object. In step S302, signal conversion processing is performed on image data obtained from the imaging. This signal conversion processing is characteristic processing of the present exemplary embodiment, and will be described below in detail.

Next, in step S303, image processing is performed on the image data that has been subjected to the signal conversion processing. Processing, such as the AWB processing and the sharpness processing, is performed here. In the present exemplary embodiment, the image processing is performed after the signal conversion processing. However, the image processing may be performed before the signal conversion processing. Next, in step S304, the image data after being subjected to the image processing is output. The data is output to the recording medium 90 or an external apparatus.

The processing described above is the imaging processing of the digital video camera 100 according to the present exemplary embodiment.

Figure 4:
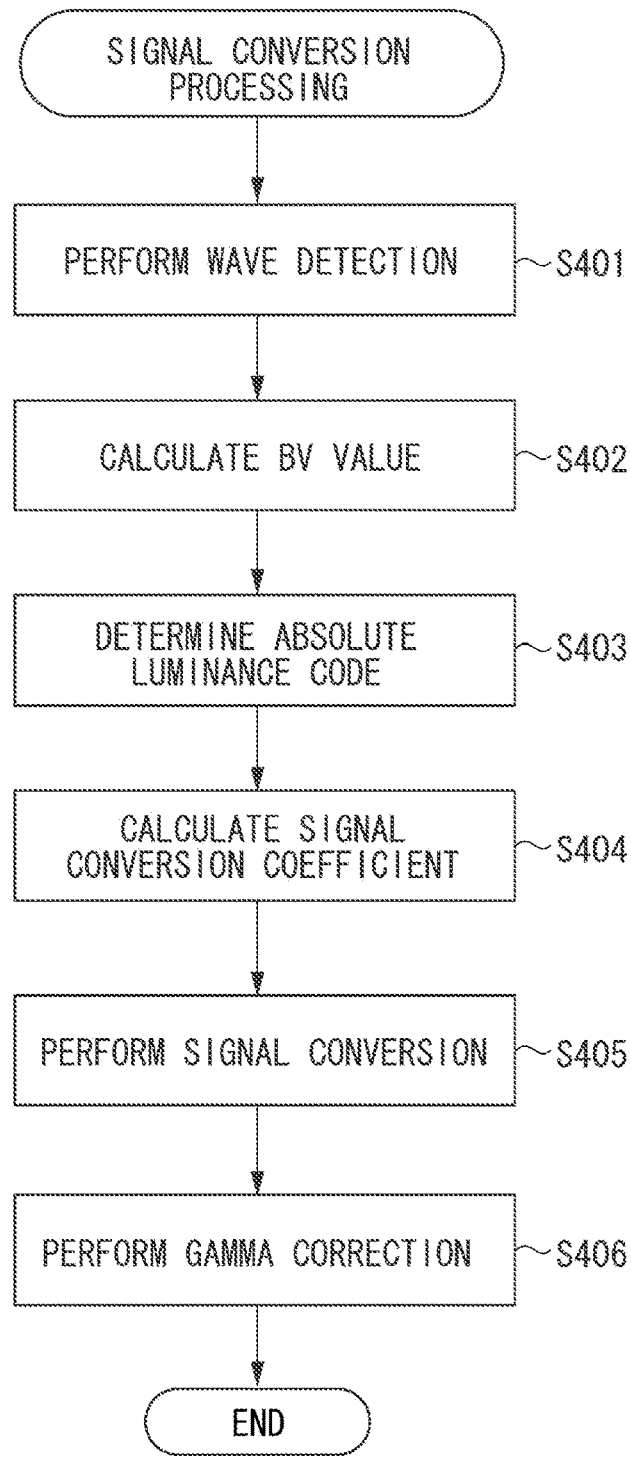
FIG. 4 is a flowchart illustrating a flow of signal conversion processing.

Next, the signal conversion processing, which is characteristic processing according to the present exemplary embodiment, will be described with reference to FIG. 4. FIG. 4 illustrates a flowchart of the signal conversion processing according to the present exemplary embodiment.

First, in step S401, the wave detection unit 201 performs wave detection on image data from the A/D converter 23 or image data from the memory control unit 15. A luminance value of an object included in an image is determined as a representative value of the image data by performing the wave detection. Examples of a way of determining the representative value include a method for calculating an average luminance of a central part of an image, a method for calculating an average luminance of a specific object such as a face detected from an image, and a method for acquiring a luminance in a designated area of an image.

Next, in step S402, the Bv calculation unit 202 calculates a Bv value (an absolute luminance value) of the object, from the representative value calculated in the wave detection unit 201. As a method for calculating the Bv value, the present exemplary embodiment uses a method for determining the Bv value from exposure parameters and the representative value acquired by the wave detection unit 201. The exposure parameters include a reference signal, an aperture value, an International Organization for Standardization (ISO) sensitivity, a shutter value, and a numerical aperture (ND) value.

In Additive System of Photographic Exposure (APEX) expression used in the present exemplary embodiment, a Bv value of a reference signal and a reference Bv value are determined as follows.

$$\text{Reference } Bv\text{value} = 2^{(Av+Tv-Sv)} \times (0.32 \times k) \ [\text{cd/m}^2] \quad \text{(Expression 1)}$$

In the Expression (1), Av, Tv, Sv, and k represent an aperture value, a shutter speed, an exposure (an exposure control value) that is obtained by converting an image-capturing sensitivity into the APEX unit, and a calibration factor, respectively. This calibration factor is used in converting a luminance value expressed in the APEX unit into cd/m$^2$ (or nit), which is the unit of absolute luminance, in such a manner that input is 18% gray. In the present exemplary embodiment, k=12.5 is assumed. In conversion of a luminance value Z expressed in the APEX unit into an absolute luminance value X, the absolute luminance value X can be determined with X=2$^Z$×(0.32×k), based on a relational expression of log 2(X/0.32×k)=Z. For example, in a case where Av=F4.0, Tv=1/128, and Sv=ISO sensitivity 200, the reference Bv value is calculated as follows, from Expression (1) described above.

$$\text{Reference } Bv\text{value} = (2^{(4(Av)+7(Tv)-6(Sv))}) \times (0.32 \times 12.5)$$
$$= 128 \ [\text{cd/m}^2]$$

Here, assume that the dynamic range of the imaging apparatus is 1200%, a ratio of a reference luminance value to a luminance-value upper limit is 20%, and a bit number of data is 14. In this case, a code of the reference signal is determined with the following Expression (2).

$$\text{Code of reference signal} = (2^{bit} \text{ number}) \times (\text{reference luminance value[\%]/dynamic range[\%]}) \quad \text{(Expression 2)}$$

If the numerical values are substituted into Expression (2), the code of the reference signal is determined with, code of reference signal=(2$^{24}$)×(20/1200)=273, i.e., the code of the reference signal is 273.

Here, assume that the code of the representative value is 2132, and X is a difference between the Bv value of the representative value and the reference Bv value. In this case, the code of the representative value is expressed by the following Expression (3):

$$\text{Code of representative value} = \text{code of reference signal} \times (2^X) \quad \text{(Expression 3)}$$

When each numerical value is substituted into this Expression (3), 2132=273×(2$^X$) is calculated, and X=2.96 is obtained.

As described above, the Bv value of the representative value is determined as follows:

$Bv$ value of the representative value=$2^{2.96} \times 128$ [cd/m$^2$]=1000 [cd/m$^2$]

The method described here is merely an example, and the Bv value of the representative value may be determined through other methods. Additionally, the Bv value may be calculated from a signal acquired from a device such as an external sensor. In the present exemplary embodiment, the method for calculating the Bv value is not limited.

Next, in step S403, the absolute luminance code determination unit 203 determines an absolute luminance code at which an output of the display apparatus matches with the Bv value of the representative value. For example, the absolute luminance code is calculated based on the input-output characteristics of the display apparatus and the Bv value of the representative value calculated in step S402. This method will be described.

Figure 5:
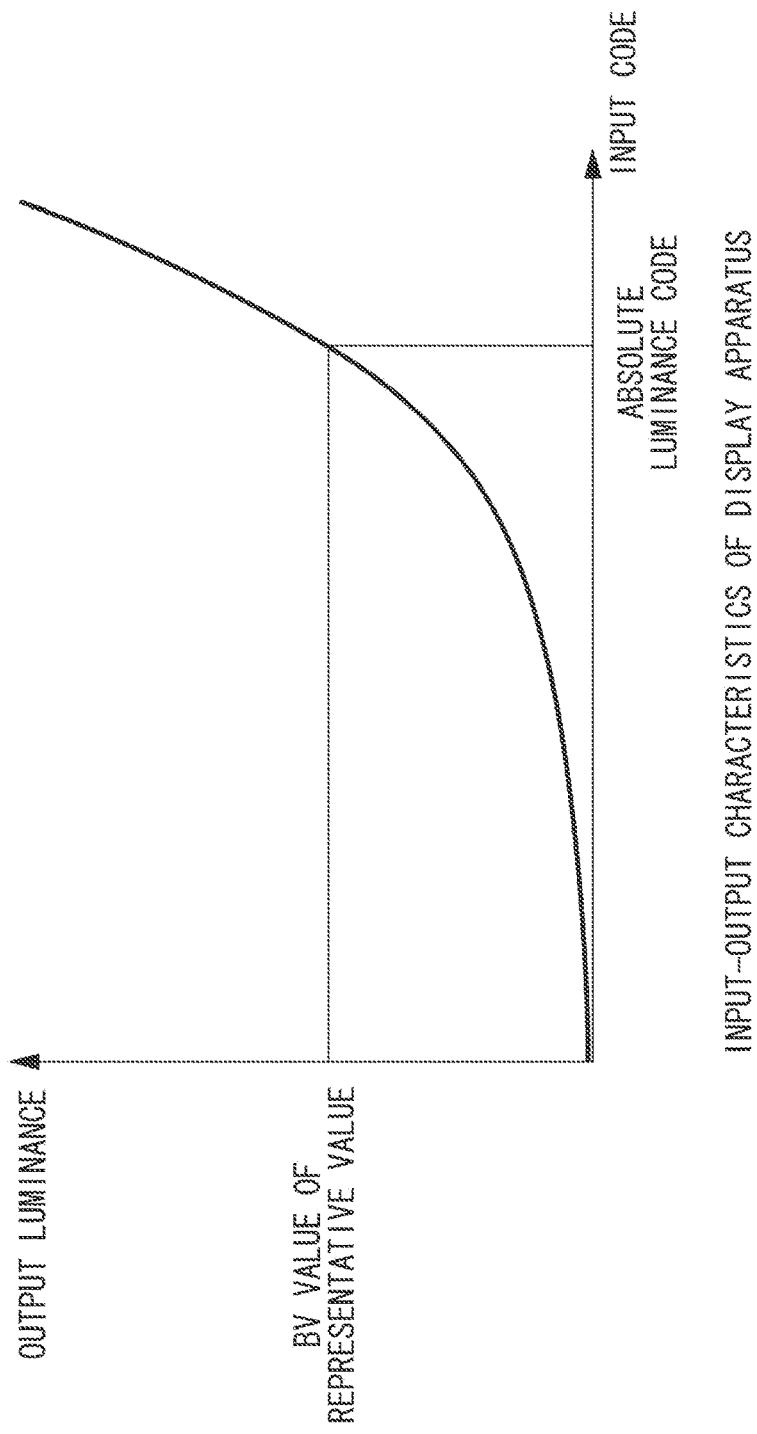
FIG. 5 is a graph illustrating input-output characteristics of a display apparatus.

FIG. 5 illustrates the input-output characteristics of the display apparatus. In a case where the input-output characteristics of the display apparatus illustrated in FIG. 5 are used, an input code at which an output luminance becomes the Bv value of the representative value is uniquely determined. The absolute luminance code may be thus determined from the input-output characteristics of the display apparatus. Alternatively, the absolute luminance code may be calculated from an expression of input-output characteristics and the Bv value of the representative value. Still alternatively, an input-output relationship may be held as table data, and the absolute luminance code may be selected from the table data based on the Bv value of the representative value.

In step S404, upon the determination of the luminance code, the conversion coefficient calculation unit 204 calculates a signal conversion coefficient, from a relationship between the representative luminance value of the object and the absolute luminance code, based on the absolute luminance code. The signal conversion coefficient is calculated so that an output from the gamma correction unit 206 matches with the absolute luminance code, when data is the representative value. For example, the signal conversion coefficient can be calculated based on the gamma characteristic acquired from the gamma correction unit 206.

Figure 6:
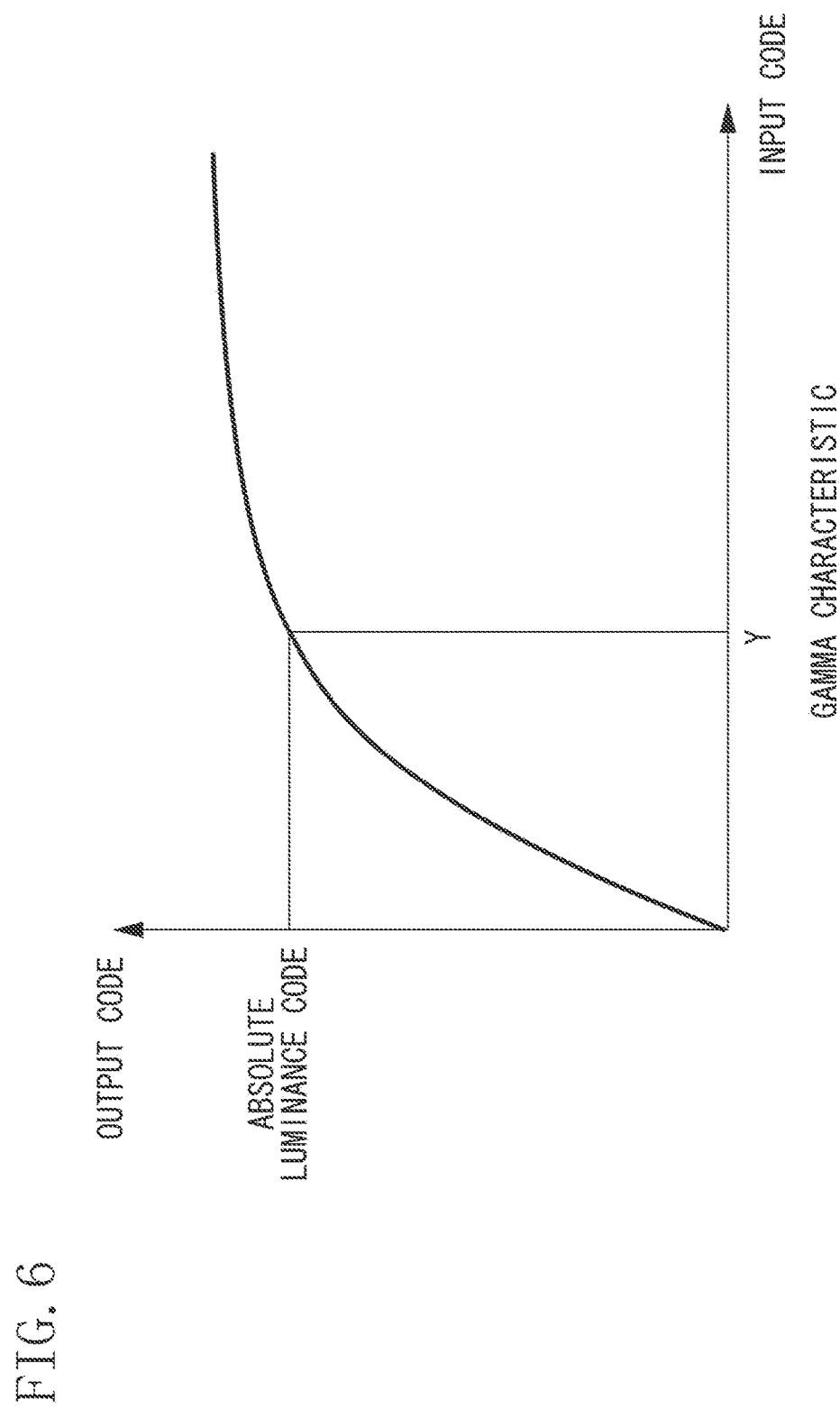
FIG. 6 is a graph illustrating a gamma characteristic.

FIG. 6 illustrates the gamma characteristic. For such a gamma characteristic, an input code with which an output code after the gamma correction becomes the absolute luminance code is Y. If the gamma has a reverse gamma relationship with input-output characteristics of an output apparatus, the signal conversion coefficient at which an output code is the absolute luminance code when data is the representative value can be determined by the following expression:

Signal conversion coefficient=$Y$/representative value (Expression 4)

In the present exemplary embodiment, the description has been provided of the case where the gamma characteristic is the characteristic of the reverse gamma with respect to the input-output characteristics of the display apparatus. However, in the present exemplary embodiment, the gamma characteristic is not limited, and may not be the characteristic of the reverse gamma.

Next, in step S405, the signal conversion unit 205 performs signal conversion on the data from the A/D converter 23 or the image data from the memory control unit 15. The signal conversion is performed based on the conversion coefficient calculated in the conversion coefficient calculation unit 204. For example, in a case where the signal conversion coefficient is determined through Expression (4), the signal conversion unit 205 performs the signal conversion by multiplying the signal conversion coefficient for the data.

The method for the signal conversion varies depending on the signal conversion coefficient. Examples of the method include, in addition to the multiplication, conversion using a function, such as a quadratic function. In the present exemplary embodiment, the conversion method is not limited in particular. In step S406, finally, the gamma correction unit 206 performs gamma correction for the image data after the signal conversion.

As a result of thus performing the signal conversion processing, the data of the representative value becomes the absolute luminance code in the output from the imaging apparatus. With the absolute luminance code entering the output apparatus, the output apparatus performs display with the Bv value of the representative value. In other words, the output apparatus can provide an output with the absolute luminance of the object, so that a video with realism can be provided.

A second exemplary embodiment of the present disclosure will be described below. In the first exemplary embodiment, an example is described in which a video signal is converted in consideration of input-output characteristics of a display apparatus so that an output by the display apparatus matches with an absolute luminance of an object. However, it is conceivable that, for a certain type of imaging apparatus, it may be desirable to keep a mode for causing the display apparatus to provide an output with a relative luminance. The present exemplary embodiment has such two modes.

Configurations same as those described in the first exemplary embodiment will be omitted.

The present exemplary embodiment has selectable modes. One is a mode for outputting an image signal in such a manner that a display apparatus displays an object with an absolute luminance value (hereinafter referred to as an absolute luminance mode). The other is a mode for outputting an image signal in such a manner that a display apparatus displays an object with a relative luminance value (hereinafter referred to as a relative luminance mode).

As for operation of the imaging device in each of the modes, the operation in the absolute luminance mode is similar to the operation described in the first exemplary embodiment. The operation in the relative luminance mode will be described below. A difference between the operation in the relative luminance mode and the operation in the absolute luminance mode will be described with reference to FIG. 4.

First, in step S401, wave detection is performed as in the absolute luminance mode. How a representative value is determined may be similar to that in the absolute luminance mode, and is not limited in particular. Other objects and other methods may be used. Next, in step S402, a Bv value of the representative value is calculated. This step S402 may be omitted in a case where the Bv value is not used in the conversion coefficient calculation unit 204 in a subsequent stage. The absolute luminance code determination in the next step S403 is not necessary for the relative luminance mode and is thus omitted.

Next, in step S404, conversion coefficient calculation is performed. In the relative luminance mode, a conversion coefficient for attaining a predetermined target value is calculated based on the representative value. For example, assume that the representative value is brightness of a face, an output is provided with the target value being a brightness of 70%. In this example, in a case where a gamma characteristic is a reverse gamma of input-output characteristics of an output apparatus, the conversion coefficient is calculated in a way represented by Expression 5 as follows, where a bit number of data is 14.

$$\text{Conversion coefficient} = (0.7 \times (2^{14}))/\text{representative value} \quad \text{(Expression 5)}$$

In this example, the target value is directly related to the representative value. However, the target value may be a value calculated from the representative value, e.g., a value related to a Bv value. The relationship between the representative value and the target value is not limited in particular.

Next, in step S405, the signal conversion unit 205 performs signal conversion on data from the A/D converter 23 or data from the memory control unit 15. The signal conversion is performed based on the conversion coefficient calculated in the conversion coefficient calculation unit 204. Step S405 is similar to step S405 in the absolute luminance mode.

As described above, differences between the mode in which output is performed at the relative luminance and the mode in which output is performed at the absolute luminance lie in that, in the mode in which output is performed at the relative luminance, the determination of the absolute luminance code is not performed and the conversion coefficient is not calculated based on the absolute luminance code in the conversion coefficient calculation. The operation is changed depending on whether the mode is the absolute luminance mode or the relative luminance mode, as described above. This configuration enables an imaging apparatus to support performing output in two ways, i.e., an output at the absolute luminance and an output at the relative luminance.

The disclosure has been described in detail based on suitable exemplary embodiments. However, the disclosure is not limited to these specific exemplary embodiments, and includes various forms in a scope not deviating from the subject matter of the disclosure. The above-described exemplary embodiments may be partially combined as appropriate.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The disclosure also includes the following case. A software program for implementing a function of any of the above-described exemplary embodiments is supplied directly from a recording medium, or using wired/wireless communication, to a system or apparatus having a computer capable of executing a program. The supplied program is then executed.

The aspect of the embodiments is thus also realized by a program code itself, which is supplied and installed on a computer to implement function processing of the aspect of the embodiments in the computer. In other words, the aspect of the embodiments also includes a computer program itself for implementing the function processing of the aspect of the embodiments.

In such a case, if a function as a program is provided, the program may be in any type of form, including an object code, a program to be executed by an interpreter, and script data to be supplied to an operating system (OS).

Examples of the recording medium for supplying the program include a hard disk, a magnetic recording medium, such as a magnetic tape, an optical/magneto-optical storage medium, and a nonvolatile semiconductor memory.

A conceivable method for supplying the program is such a method that a computer program for forming the aspect of the embodiments is stored in a server on a computer network, and a client computer downloads the computer program when connected.

According to the above-described exemplary embodiments, display can be provided with an absolute luminance of an object by an image signal being converted in consideration of input-output characteristics of a display apparatus, and video display with realism can be achieved.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-188326, filed Sep. 27, 2016, which is hereby incorporated by reference herein in its entirety.

What is claimed is:

1. An image processing apparatus that receives an input of an image signal obtained by imaging an object, and performs signal conversion on the image signal to output the image signal to a display apparatus, the image processing apparatus comprising:

at least one processor or circuit configured to function as following units:

a calculation unit configured to calculate an absolute luminance value of the object from a luminance value of the object acquired from the image signal and an exposure parameter in the imaging;

a determination unit configured to determine a predetermined absolute luminance code for the luminance value of the object according to input-output characteristics of the display apparatus so that the object is displayed at the absolute luminance value on the display apparatus;

a conversion unit configured to perform signal conversion for converting the image signal based on a relationship between the luminance value of the object and the absolute luminance code; and a correction unit configured to perform gamma correction on the image signal output from the conversion unit, wherein the determination unit determines the predetermined absolute luminance code for the luminance value of the object in the image signal after the gamma correction.

2. The image processing apparatus according to claim 1, wherein the exposure parameter includes at least one of an aperture value, an ISO sensitivity, a shutter speed, and an ND value in the imaging.

3. The image processing apparatus according to claim 1, wherein the luminance value of the object is an average luminance of an object located in a central part within an image.

4. The image processing apparatus according to claim 1, wherein the luminance value of the object is an average luminance of a face area of an object within an image.

5. The image processing apparatus according to claim 1, wherein the luminance value of the object is an average luminance of an object, designated by a user, within an image.

6. The image processing apparatus according to claim 1, wherein the input-output characteristics of the display apparatus are input from the display apparatus connected to the image processing apparatus.

7. The image processing apparatus according to claim 1, wherein a mode can be selected from a first mode and a second mode, the first mode is a mode in which an image signal is input so that the object is displayed at an absolute luminance value on the display apparatus, the second mode is a mode in which an image signal is input so that the object is displayed at a relative luminance value on the display apparatus, and in a case where the first mode is selected, an image signal after signal conversion by the conversion unit is output.

8. An imaging apparatus comprising:
the image processing apparatus according to claim 1; and
an image sensor configured to input an image signal into the image processing apparatus by imaging an object.

9. An image processing method for receiving an input of an image signal obtained by imaging an object, and performing signal conversion on the image signal to output the image signal to a display apparatus, the image processing method comprising:
calculating an absolute luminance value of the object from a luminance value of the object acquired from the image signal and an exposure parameter in the imaging;
determining a predetermined absolute luminance code for the luminance value of the object according to input-output characteristics of the display apparatus so that the object is displayed at the absolute luminance value on the display apparatus;
performing signal conversion for converting the image signal based on a relationship between the luminance value of the object and the absolute luminance code; and
performing gamma correction on the image signal output from the converting,
wherein the determining determines the predetermined absolute luminance code for the luminance value of the object in the image signal after the gamma correction.

10. The image processing method according to claim 9, wherein the exposure parameter includes at least one of an aperture value, an ISO sensitivity, a shutter speed, and an ND value in the imaging.

11. The image processing method according to claim 9, wherein the luminance value of the object is an average luminance of an object located in a central part within an image.

12. The image processing method according to claim 9, wherein the luminance value of the object is an average luminance of a face area of an object within an image.

13. The image processing method according to claim 9, wherein the luminance value of the object is an average luminance of an object, designated by a user, within an image.

14. The image processing method according to claim 9, wherein the input-output characteristics of the display apparatus are input from the display apparatus connected to an image processing apparatus.

15. The image processing method according to claim 9, wherein a mode can be selected from a first mode and a second mode, the first mode is a mode in which an image signal is input so that the object is displayed at an absolute luminance value on the display apparatus, the second mode is a mode in which an image signal is input so that the object is displayed at a relative luminance value on the display apparatus, and in a case where the first mode is selected, an image signal after signal conversion by a conversion unit is output.

16. The image processing method according to claim 9 further comprising inputting an image signal into an image processing apparatus by imaging an object.

17. A non-transitory computer-readable storage medium storing a program for causing a computer to execute following steps for receiving an input of an image signal obtained by imaging an object, and performing signal conversion on the image signal to output the image signal to a display apparatus, comprising:
calculating an absolute luminance value of the object from a luminance value of the object acquired from the image signal and an exposure parameter in the imaging;
determining a predetermined absolute luminance code for the luminance value of the object according to input-output characteristics of the display apparatus so that the object is displayed at the absolute luminance value on the display apparatus;
performing signal conversion for converting the image signal based on a relationship between the luminance value of the object and the absolute luminance code; and
performing gamma correction on the image signal output from the converting,
wherein the determining determines the predetermined absolute luminance code for the luminance value of the object in the image signal after the gamma correction.

18. The non-transitory computer-readable storage medium according to claim 17, wherein the exposure parameter includes at least one of an aperture value, an ISO sensitivity, a shutter speed, and an ND value in the imaging.

19. The non-transitory computer-readable storage medium according to claim 17, wherein the luminance value of the object is an average luminance of an object located in a central part within an image.

20. The non-transitory computer-readable storage medium according to claim 17, wherein the luminance value of the object is an average luminance of a face area of an object within an image.

* * * * *